(12) United States Patent
Suzuki (10) Patent No.: US 8,150,580 B2
(45) Date of Patent: Apr. 3, 2012

(54) MOTOR CONTROLLER AND ELECTRIC POWER STEERING SYSTEM

(75) Inventor: Hiroshi Suzuki, Okazaki (JP)

(73) Assignee: Jtekt Corporation, Osaka-shi (JP)

( * ) Notice: Subject to any disclaimer, the term of this patent is extended or adjusted under 35 U.S.C. 154(b) by 874 days.

(21) Appl. No.: 11/966,010

(22) Filed: Dec. 28, 2007

(65) Prior Publication Data

US 2008/0167779 A1 Jul. 10, 2008

(30) Foreign Application Priority Data

Jan. 9, 2007 (JP) ................................. 2007-001376

(51) Int. Cl.
*A01B 69/00* (2006.01)
*B62D 6/00* (2006.01)
*B62D 11/00* (2006.01)
*B63G 8/20* (2006.01)
*B63H 25/04* (2006.01)
*G05D 1/00* (2006.01)

(52) U.S. Cl. .......................................... 701/42; 701/41
(58) Field of Classification Search .................... 701/41, 701/42

See application file for complete search history.

(56) References Cited

U.S. PATENT DOCUMENTS

| 2004/0206571 A1* | 10/2004 | Nishizaki et al. | 180/446 |
| 2006/0049784 A1* | 3/2006 | Suzuki | 318/139 |
| 2006/0202582 A1* | 9/2006 | Umesaki et al. | 310/162 |

FOREIGN PATENT DOCUMENTS

| JP | 2001-103783 | 4/2001 |
| JP | 2004-328814 | 11/2004 |
| JP | 2006-262668 | 9/2006 |

OTHER PUBLICATIONS

Japanese Office Action mailed on Dec. 6, 2011 for Application No. JP 2007-001376 filed Jan. 9, 2007 (with English translation).

* cited by examiner

*Primary Examiner* — Tuan C. To
*Assistant Examiner* — Imran Mustafa
(74) *Attorney, Agent, or Firm* — Oblon, Spivak, McClelland, Maier & Neustadt, L.L.P.

(57) ABSTRACT

In a case where a computing period of a torque ripple compensation section which computes current compensation values Δid and Δiq to be caused to flow into a motor in order to prevent occurrence of a torque ripple in the motor differs from a control period of a current control section which controls a feedback to the motor in such a way that current command values i*d and i*q additionally provided with the current compensation values Δid and Δiq flow into the motor, the microcomputer sets the current compensation values Δid and Δiq to zero when a rotor angular velocity ωre of the motor is equal to or greater than a first threshold value $\omega_1$.

4 Claims, 8 Drawing Sheets

MOTOR CONTROLLER AND ELECTRIC POWER STEERING SYSTEM

This application is based upon and claims the benefit of priority of Japanese Patent Application No. 2007-001376 filed on Jan. 9, 2007, the contents of which are incorporated herein by reference in its entirety.

BACKGROUND OF THE INVENTION

The present invention relates to a motor controller and an electric power steering system.

An electric power steering system described in, for example, JP-A-2004-328814 has hitherto been known as a system for reducing a torque ripple in a motor which assists steering operation performed by a steering wheel of a vehicle. The electric power steering system changes a compensating current computed by a toque ripple compensation section so as to prevent occurrence of a torque ripple in a motor in accordance with the rotational speed of the motor as well as in accordance with a load imposed on the motor. As a result, a current control section provides the motor with an appropriate compensating current even in a case where the rotational speed of the motor changes from moment to moment according to a driving condition besides the case of occurrence of variations in the load imposed on the motor, so that occurrence of a torque ripple can be reduced sufficiently.

Figure 8:
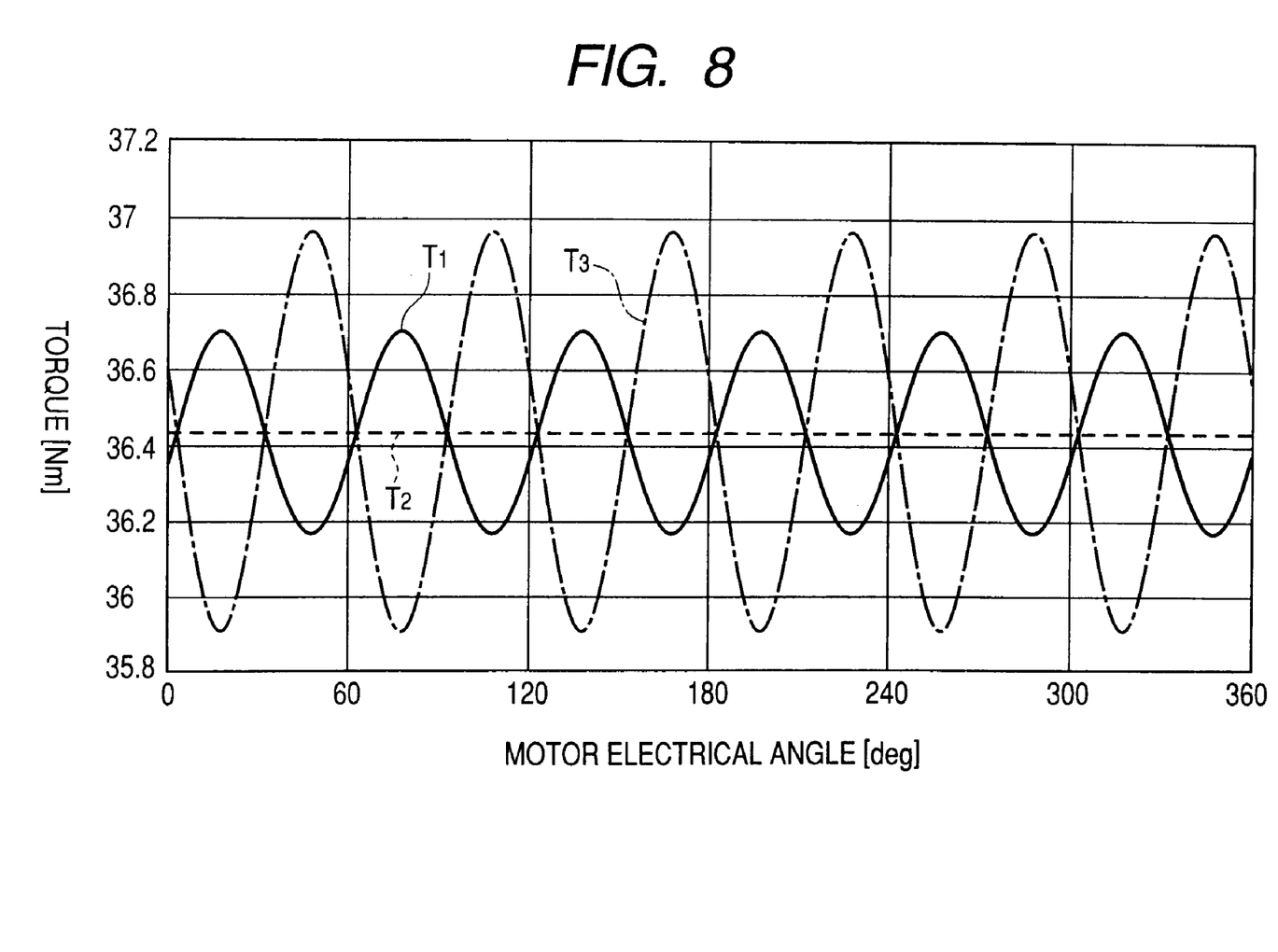
FIG. 8 is a waveform chart illustrating an effect of compensation of a torque ripple yielded when a computing period of a torque ripple compensation section coincides with a control period of a current control section and an effect of compensation of a torque ripple yielded when the computing period of the torque ripple compensation section differs from the control period of the current control section.

For instance, as shown in FIG. 8, the current control section provides the motor with the compensating current computed by the torque ripple compensation section, thereby compensating for a torque $T_1$ which includes a torque ripple and which is acquired before compensation (indicated by a solid line in FIG. 8) (hereinafter called an "uncompensated torque") in such a way that occurrence of a torque ripple is reduced sufficiently as in the case of torque $T_2$ (indicated by a broken line in FIG. 8) acquired after compensation (hereinafter called a "compensated torque").

In JP-A-2004-328814, consideration is given solely to the case where a computing period of the torque ripple compensation section coincides with a control period of the current control section; however, no consideration is given to a case where the computing period of the torque ripple compensation section differs from the control period of the current control section. In a commonly-adopted microcomputer except a high-performance microcomputer, the computing period of the torque ripple compensation section becomes longer than the control period of the current control section because of restrictions on a resource of the microcomputer.

In the case where the computing period of the torque ripple compensation section is longer than the control period of the current control section, an offset arises in electrical angles as the speed of rotation of the motor increases, and control is performed while the torque ripple compensation and the current control are out of phase with each other. Therefore, an effect for reducing a torque ripple is diminished. Moreover, when the rotational speed of the motor increases further, it may be the case where the torque ripple (a torque ripple achieved after compensation) of the motor compensated for in accordance with the compensating current computed by the torque ripple compensation section will become worse than the torque ripple acquired before compensation.

For instance, as shown in FIG. 8, even if a compensating current computed as mentioned above is provided to the motor in a case where the computing period of the torque ripple compensation section is longer than the control period of the current control section, a torque ripple in a compensated torque $T_3$ (indicated by a dashed line shown in FIG. 8) will become worse than the torque ripple in the uncompensated torque $T_1$ when the rotational speed of the motor increases to a predetermined speed or more.

SUMMARY OF THE INVENTION

The present invention has been conceived to solve the above-mentioned problem and aims at providing a motor controller and an electric power steering system which can reduce a torque ripple.

In order to achieve the above object, the present invention provides the following arrangements.

(1) A motor controller comprising:
   a rotational angle detector that detects a rotational angle of a motor;
   a rotational speed detector that detects a rotational speed of the motor;
   a compensating current computing unit that computes, based on the rotational angle and a predetermined target current command value, a compensating current command value defining a current to flow into the motor to prevent occurrence of a torque ripple, which is derived from distortion in a waveform of electromotive force induced by the motor;
   a correction unit that corrects the predetermined target current command value in accordance with the compensating current command value; and
   a controller which performs a feedback control for the motor in such a way that an electric current corresponding to the predetermined target current command value corrected by the correction unit flows into the motor, the controller constituting a system for controlling an electric current of the motor by the feedback control, a computing period of the compensating current computing unit being different from a control period of the controller,
   wherein when the rotational speed is equal to or greater than a first threshold value, the compensating current computing unit sets the compensating current command value to zero, where the first threshold value is the rotational speed of the motor where a torque ripple of the motor controlled by the controller based on the predetermined target current command value corrected by the correction unit becomes equal to a torque ripple of the motor acquired based on the predetermined target current command value without corrected by the correction unit.

(2) The motor controller according to (1), wherein, when the rotational speed is equal to or greater than a second threshold value of a predetermined rotation speed slower than the first threshold value and is not equal to or greater than the first threshold value, the compensating current computing unit performs computation so as to reduce the compensating current command value as the rotational speed increases; and, when the rotational speed is not equal to or greater than the second threshold value, the compensating current computing unit performs computation so as to change the compensating current command value to a current command value to be caused to flow into the motor in order to prevent occurrence of the torque ripple.

(3) An electric power steering system for assisting steering by causing a motor to generate steering assist force in response to steering operation, a predetermined target current command value being a current command value determined according to the operation for steering a vehicle, wherein driving of the motor is controlled by the motor controller according to (1) or (2).

According to the first aspect of the invention, in a motor controller in which a computing period of the compensating current computing unit that computes a compensating current command value to be caused to flow into the motor in order to prevent occurrence of a torque ripple differs from a control period of the controller that controls a feedback to the motor in such a way that the current corresponding to the predetermined target current command value corrected by the correction unit flow into the motor, when the rotational speed of the motor achieved, in a case where a torque ripple of the motor controlled by the controller in accordance with the predetermined target current command value corrected by the correction unit becomes equal to a torque ripple of the motor acquired before correction is made by the correction unit, is taken as a first threshold value and when the rotational speed is equal to or greater than the first threshold value, the compensating current computing unit sets the compensating current command value to zero.

As a result, when the rotational speed of the motor is not equal to or greater than the first threshold value, the controller controls the motor in accordance with the predetermined target current command value corrected by the correction unit, thereby reducing the torque ripple in the motor. In the meantime, when the rotational speed of the motor becomes equal to or greater than the first threshold value, the compensating current command value comes to zero, so that the torque ripple is not compensated for. Consequently, when the rotational speed of the motor is equal to or greater than the first threshold value, the compensated torque ripple does not become worse than the uncompensated torque ripple, and at least the uncompensated torque ripple is maintained, so that the torque ripple can be reduced.

According to the second aspect of the invention, when the rotational speed of the motor is equal to or greater than the second threshold value and not equal to or greater than the first threshold value, the compensating current computing unit performs computation so as to reduce the compensating current command value as the rotational speed increases; and, when the rotational speed is not equal to or greater than the second threshold value, the compensating current computing unit performs computation so as to change the compensating current command value to a current command value to be caused to flow into the motor in order to prevent occurrence of the torque ripple.

Even when the rotational speed of the motor is not equal to or greater than the first threshold value, the compensating current command value can be computed appropriately by setting the second threshold value in accordance with steering conditions. Consequently, even when the rotational speed of the motor is not equal to or greater than the first threshold value, the torque ripple can be reduced.

In the third aspect of the invention, the motor controller defined in the first and second aspects causes the motor to generate steering assist force in response to steering operation, thereby assisting steering operation. As a result, there can be implemented an electric power steering system which exhibits the working-effects yielded by the invention defined in the first and second aspects, such as an effect of the compensating current command value coming to zero when the rotational speed of the motor is increased to the first threshold value or more, so that a compensated torque ripple does not become worse than an uncompensated torque ripple, and the like. Therefore, there can be provided an electric power steering system is capable of reducing a torque ripple even when the rotational speed of the motor is increased.

1: ELECTRIC POWER STEERING SYSTEM
5: ELECTRONIC CONTROL UNIT (ECU)
6: BRUSHLESS MOTOR
10: MICROCOMPUTER (MOTOR CONTROLLER)
12: DIFFERENTIATOR (ROTATIONAL SPEED DETECTOR)
14: FREQUENCY COMPUTING SECTION
16: GAIN-PHASE DETERMINATION SECTION
16a: FREQUENCY CHARACTERISTIC MAP
18: SUBTRACTOR
20: BASIC COMPENSATING CURRENT DETERMINATION SECTION
20a: COMPENSATING CURRENT MAP
22: AMPLITUDE DETERMINATION SECTION
24: CORRECTION FACTOR COMPUTING SECTION
25: STEERING SPEED GAIN DETERMINATION SECTION
25a: STEERING SPEED GAIN MAP
26, 28: MULTIPLIER
62: POSITION DETECTION SENSOR
114: TARGET CURRENT COMPUTING SECTION
118: TORQUE RIPPLE COMPENSATION SECTION (COMPENSATING CURRENT COMPUTING UNIT)
121, 122: ADDER (CORRECTION UNIT)
123, 124: SUBTRACTOR
126: d-AXIS CURRENT PI CONTROL SECTION
128: p-AXIS CURRENT PI CONTROL SECTION
150: THREE-PHASE PWM CONTROL SECTION
152: MOTOR DRIVE CIRCUIT
162: ROTOR ANGULAR POSITION DETECTOR (ROTATIONAL ANGLE DETECTOR)
200: CURRENT CONTROL SECTION (CONTROLLER)
Ts: STEERING TORQUE SIGNAL
$i^*d_0$: d-AXIS BASIC CURRENT COMMAND VALUE (TARGET CURRENT COMMAND VALUE)
$i^*q_0$: q-AXIS BASIC CURRENT COMMAND VALUE (TARGET CURRENT COMMAND VALUE)
Δid: d-AXIS CURRENT COMPENSATION VALUE (COMPENSATING CURRENT COMMAND VALUE)
Δiq: q-AXIS CURRENT COMPENSATION VALUE (COMPENSATING CURRENT COMMAND VALUE)

i*d: d-AXIS CURRENT COMMAND VALUE (CORRECTED PREDETERMINED TARGET CURRENT COMMAND VALUE ACQUIRED)
i*q: q-AXIS CURRENT COMMAND VALUE (CORRECTED PREDETERMINED TARGET CURRENT COMMAND VALUE ACQUIRED)
id: d-AXIS CURRENT DETECTION VALUE
iq: q-AXIS CURRENT DETECTION VALUE
ed: d-AXIS CURRENT DEVIATION
eq: q-AXIS CURRENT DEVIATION
θre: ELECTRIC ANGLE (ROTATIONAL ANGLE OF MOTOR)
$\omega_1$: FIRST THRESHOLD VALUE
$\omega_2$: SECOND THRESHOLD VALUE
ωre: ROTOR ANGULAR VELOCITY (ROTATIONAL SPEED OF MOTOR)
Δθe: PHASE DIFFERENCE OF CURRENT CONTROL SYSTEM
Gf: GAIN OF CURRENT CONTROL SYSTEM
Gω: STEERING SPEED GAIN
θmre: CORRECTED ELECTRICAL ANGLE
Rm: CORRECTION FACTOR

DETAILED DESCRIPTION OF PREFERRED EMBODIMENTS

An embodiment of the present invention will be described hereunder by reference to the accompanying drawings.

<1 Overall Configuration>

Figure 1:
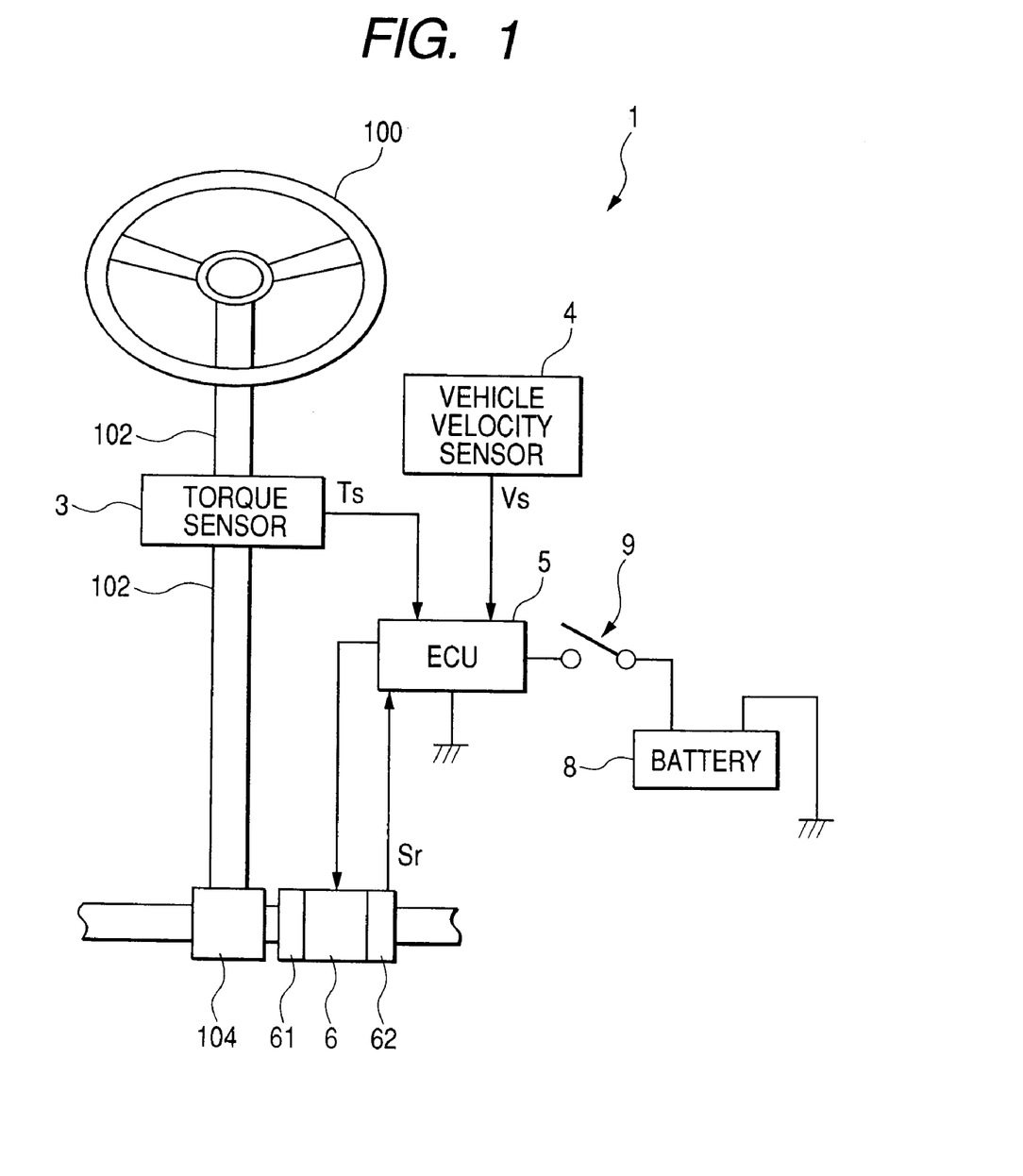
FIG. 1 is a block diagram showing the configuration of an electric power steering system of an embodiment of the present invention.

FIG. 1 is a schematic diagram showing the configuration of an electric power steering system 1 of an embodiment of the present invention in conjunction with the configuration of a vehicle related to the system. The electric power steering system 1 has a steering shaft 102 fixed at its one end to a handle (a steering wheel) 100 serving as an operation unit for steering purpose; a rack-and-pinion mechanism 104 joined to the other end of the steering shaft 102; a torque sensor 3 for detecting steering torque applied to the steering shaft 102 by operation of the handle 100; a brushless motor 6 which generates steering-assist force for lessening a burden imposed on a driver during handle operation (steering operation); a ball screw drive section 61 for transmitting the steering-assist force to a rack shaft; a position detection sensor 62, such as a resolver, for detecting a rotational position of a rotor of the brushless motor 6; and an electronic control unit (ECU) 5 which is supplied with power from a vehicle-mounted battery 8 by way of an ignition switch 9 and which drives and controls the motor 6 in accordance with sensor signals from the torque sensor 3, a vehicle velocity sensor 4, and the position detection sensor 62.

When the driver operates the handle 100 in a vehicle equipped with such an electric power steering system 1, the torque sensor 3 detects steering torque stemming from operation and outputs a steering torque signal Ts showing steering torque. In the meantime, the vehicle velocity sensor 4 detects the velocity of the vehicle (vehicle velocity) and outputs a vehicle velocity signal Vs showing a vehicle velocity. The ECU 5 serving as a controller drives the motor 6 in accordance with the steering torque signal Ts and the vehicle velocity signal Vs and a rotational position signal Sr showing the rotational position of a rotor detected by the position detection sensor 62.

As a result, the motor 6 generates steering-assist force, and the steering-assist force is applied to the rack shaft by way of the ball screw drive section 61, whereby the burden imposed on the driver during steering operation is reduced. Specifically, the rack shaft performs reciprocal movement by a sum of steering force stemming from the steering torque applied by handle operation and the steering-assist force generated by the motor 6. Both ends of the rack shaft are linked to unillustrated wheels by way of unillustrated linkage members consisting of tie rods and steering knuckle arms, and the orientation of the wheels is changed according to reciprocal movement of the rack shaft.

<2 Summary of Motor Control>

The motor 6 of the present embodiment is a sinusoidal-wave-drive brushless motor built from a rotor (hereinafter called also a "rotating excitation field") which is formed from a permanent magnet and which serves as a magnetic field system; and a stator consisting of three-phase coils; namely, a U phase coil, a V phase coil, and a W phase coil.

Target current values; i.e., current command values of respective phases which are to be caused to flow into the U phase coil, the V phase coil, and the W phase coil in order to cause the motor 6 to generate appropriate steering-assist force, are expressed by the following equations $$i^*u = I^* \sin \theta re \qquad (1a)$$

$$i^*v = I^* \sin(\theta re - 2\pi/3) \qquad (1b)$$

$$i^*w = I^* \sin(\theta re - 4\pi/3) = -i^*u - i^*v \qquad (1c)$$

where i*u designates a u-phase current command value; i*v designates a v-phase current command value; i*w designates a w-phase current command value; and θre designates an angle of the rotating excitation field (called an "electrical angle") which is determined in clockwise with reference to the U phase coil. Provided that a mechanical angle of the rotor is taken as θm and where the number of poles is 2p, the electrical angle is determined as θre =p·θm.

A voltage command value to be applied to the brushless motor is usually computed from a deviation between a current target value and a value of a detected motor current through control operation. However, in order to reduce a phase delay, a current command value is expressed by a d-q coordinate during control operation. The voltage command value is computed from a d-axis current command value and a q-axis current command value. The d-q coordinate is a rotating coordinate system which rotates in synchronism with the rotating excitation field (the rotor) consisting of a permanent magnet, wherein the direction of a magnetic flux of the rotating excitation field is taken as a d-axis, and a direction orthogonal to the d-axis is taken as a q-axis. Although current command values i*u, i*v, and i*w of respective phases are alternating currents, the current command value achieved in the d-q coordinate is a direct current.

The current command values of respective phases expressed by the equations (1a) to (1c) are expressed by the d-q coordinate as follows:

$$i^*d = 0 \qquad (2a)$$

$$i^*q = -\sqrt{(3/2)}I^* \qquad (2b)$$

where i*d designates a d-axis current command value, and i*q designates a q-axis current command value.

In relation to a motor current, when a current detector detects a u-phase current and a v-phase current, a d-axis current detection value id and a q-axis current detection value iq are computed from results of detection by the following equations:

$$id = \sqrt{2}\{iv \sin \theta re - iu \sin(\theta re - 2\pi/3)\} \qquad (3a)$$

$$iq = \sqrt{2}\{iv \cos \theta re - iu \cos(\theta re - 2\pi/3)\} \qquad (3b)$$

where iu designates a u-phase current detection value; iv designates a v-phase current detection value, and θre designates an electrical angle.

In the present embodiment, a current control section 200 to be described later controls a feedback to the motor 6 in such a way that a deviation ed=i*d−id between a command value i*d and a detection value id pertaining to the d-axis current and a deviation eq=i*q−iq between a command value i*q and a detection value iq pertaining to the q-axis current are canceled, respectively.

<3 Configuration of Controller>

Figure 2:
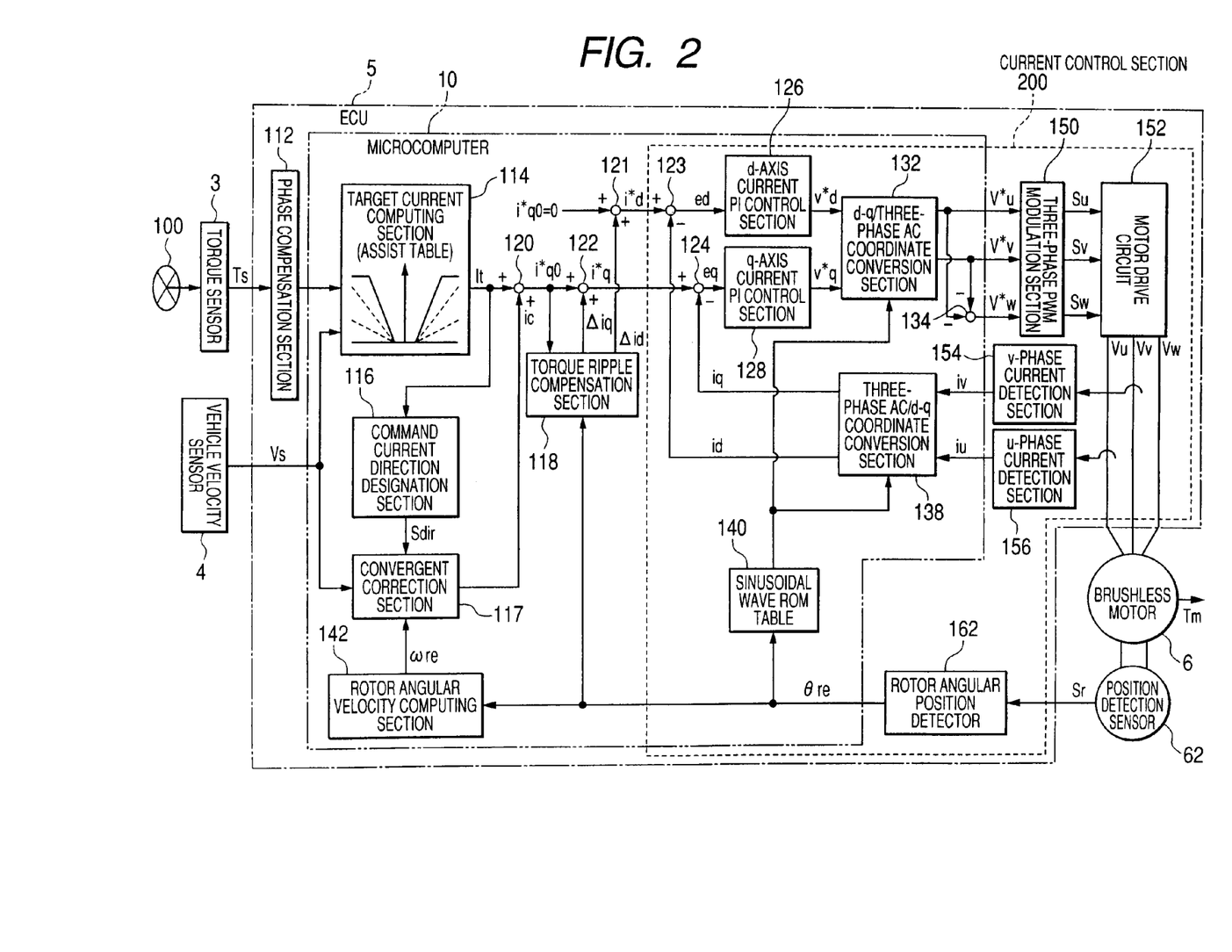
FIG. 2 is a block diagram showing an electrical configuration of an ECU of the electric power steering system.

In the present embodiment, the ECU 5 serving as a controller of the electric power steering system 1 performs controlling of a feedback to the motor 6, such as that mentioned above. FIG. 2 is a block diagram showing the electrical configuration of the ECU 5. The ECU 5 is formed from a phase compensator 112, a microcomputer 10, and a motor drive section.

The microcomputer 10 executes a predetermined program stored in internal memory thereof, thereby acting as a motor control section including a target current computing section 114, a command current direction designation section 116, a convergent correction section 117, a torque ripple compensation section 118, adders 120, 121, and 122, subtractors 123 and 124, a d-axis current PI control section 126, a q-axis current PI control section 128, a d-q/three-phase AC coordinate conversion section 132, a sign-reversing adder 134, a three-phase AC/d-q coordinate conversion section 138, a sinusoidal wave ROM table 140, and a rotor angular velocity computing section 142.

The motor drive section is hardware (a circuit) which drives the brushless motor 6 having three phases consisting of the u-phase, the v-phase, and the w-phase in accordance with a voltage command value output from the microcomputer 10 serving as the motor control section. The motor drive section includes a three-phase PWM control section 150, a motor drive circuit 152, a u-phase current detector 156, a v-phase current detector 154, and a rotor angular position detector 162.

In the present embodiment, a steering torque applied to the steering shaft 102 by operation of the handle 100 is detected by the torque sensor 3. A steering torque signal Ts output from the torque sensor 3 is input to the ECU 5 having the above configuration, and a vehicle velocity is detected by the vehicle velocity sensor 4. A vehicle velocity signal Vs output from the vehicle velocity sensor 4 is also input to the ECU 5.

In the ECU 5, the phase compensator 112 subjects the input steering torque signal Ts to phase compensation, whereby the phase-compensated signal is input to the target current computing section 114. In the meantime, the vehicle velocity signal Vs output from the vehicle velocity sensor 4 is input to the target current computing section 114 and the convergent correction section 117 in the ECU 5. Moreover, a rotational position signal Sr output from the position detection sensor 62 attached to the motor 6 is input to the rotor angular position detector 162 in the ECU 5, and the rotor angular position detector 162 outputs a signal showing a rotational position of the rotating excitation field (a permanent magnet) serving as the rotor of the motor 6; namely, an electrical angle θre. The signal showing the electrical angle θre is input to the torque ripple compensation section 118, the sinusoidal wave ROM table 140, and the rotor angular velocity computing section 142.

In accordance with the steering torque signal Ts and the vehicle velocity signal Vs, the target current computing section 114 computes a current target value It which is a value of an electrical current to be supplied to the motor 6. Specifically, a table (called an "assist map") showing, while taking a vehicle velocity as a parameter, a relationship between a steering torque and a target value of the electric current to be supplied to the motor 6 in order to generate appropriate steering assist force is previously held in the target current computing section 114. The target current computing section 114 sets a current target value It by reference to the assist map.

The current target value It is a value with a sign showing a current command value equivalent to the q-axis current expressed by the previously-described equation (2b). A positive or negative sign of the value shows the direction of steering assistance; i.e., whether the motor 6 should be caused to generate a torque oriented in the direction of assisting rightward steering action or a torque oriented in the direction of assisting leftward steering action.

The command current direction designation section 116 generates a signal showing the positive or negative sign of the current target value It; that is, a signal (hereinafter called a "direction signal") Sdir showing the direction of steering assistance. The direction signal Sdir is input to the convergent correction section 117. Further, the rotor angular velocity computing section 142 computes a rotor angular velocity ωre in accordance with a signal showing the electrical angle θre equivalent to a rotor angle. The signal showing the rotor angular velocity ωre is also input to the convergent correction section 117.

In accordance with these signals and the vehicle velocity signal Vs, the convergent correction section 117 computes a compensation current value ic intended for ensuring convergence of a vehicle. The adder 120 adds the compensation current value ic to the current target value It, and outputs a resultantly-acquired addition value as a q-axis basic current command value $i^*q_0$. The q-axis basic current command value $i^*q_0$ is a command value of an electric current corresponding to a torque which is to be generated by the motor 6 for assisting steering action, and is input to the adder 122. In the meantime, the d-axis current is not involved in the torque, and hence the d-axis basic current command value $i^*d_0$ serving as the basic of the d-axis current command value is input, as $i^*d_0=0$, to the adder 121.

The torque ripple compensation section 118 serves as a compensating current computing unit which computes a command value of a compensating current to be caused to flow into the motor 6 in order to prevent occurrence of a torque ripple, which is derived from distortion in the waveform of electromotive force induced by the motor 6. In accordance with the electrical angle θre and the q-axis basic current command value $i^*q0$, the torque ripple compensation section 118 determines, as the command value of the compensating current, a d-axis current compensation value Δid and a q-axis current compensation value Δiq (which will be described in detail later). The current compensation value Δid is input to the adder 121, and the current compensation value Δiq is input to the adder 122.

The adder 121 adds the input d-axis current compensation value Δid to the d-axis basic current command value $i^*d_0$, thereby determining the d-axis current command value i*d. The adder 122 adds the input q-axis current compensation value Δiq to the q-axis basic current command value $i^*q_0$, thereby determining the q-axis current command value i*q.

$$i^*d = i^*d_0 + \Delta id \qquad (4a)$$

$$i^*q = i^*q_0 + \Delta iq \qquad (4b)$$

These equations (4a) and (4b) show that the target current command values of the electric current to be caused to flow into the motor 6 in order to obtain appropriate steering assistant force are corrected in accordance with the d-axis current compensation value Δid and the q-axis current compensation value Δiq in order to prevent occurrence of a torque ripple.

The u-phase current detector 156 detects a u-phase current of the electric currents supplied to the motor 6 from the motor drive circuit 152 and outputs a u-phase current detection value iu. The v-phase current detector 154 detects a v-phase current of the electric currents and outputs a v-phase current detection value iv. The sinusoidal wave ROM table 140 stores various values of the angle θ and various values of sin θ in a mutually-associated manner, and outputs a sinusoidal wave value sin θre responsive to the electrical angle θre showing a signal from the rotor angular position detector 162.

The three-phase AC/d-q coordinate conversion section 138 converts the u-phase current detection value iu and the v-phase current detection value iv into values falling within the d-q coordinate; namely, a d-axis current detection value id and a q-axis current detection value iq, by the equations (3a) and (3b) through use of the sinusoidal wave value sin θre. The thus-acquired d-axis current detection value id is input to the subtractor 123, and the q-axis current detection value iq is input to the subtractor 124.

The subtractor 123 computes a d-axis current deviation ed=i*d−id; that is, a deviation between the d-axis current command value i*d from the adder 121 and the d-axis current detection value id from the three-phase AC/d-q coordinate conversion section 138. The d-axis current PI control section 126 determines a d-axis voltage command value v*d by proportional integral control processing of the d-axis current deviation ed.

In the meantime, the subtractor 124 computes a q-axis current deviation eq=i*q−iq; that is, a deviation between the q-axis current command value i*q from the adder 122 and the q-axis current detection value iq from the three-phase AC/d-q coordinate conversion section 138. The q-axis current PI control section 128 determines a q-axis voltage command value v*q by proportional integral control processing of the q-axis current deviation eq.

The d-axis voltage command value v*d and the q-axis voltage command value v*q are computed by the following equations:

$$v^*d = Kp\ [ed + (1/Ti)\int eddt] \quad (5a)$$

$$v^*q = Kp\ [eq + (1/Ti)\int eqdt] \quad (5b)$$

where Kp designates a proportional gain and Ti designates an integral time.

The d-q/three-phase AC coordinate conversion section 132 converts the d-axis voltage command value v*d and the q-axis voltage command value v*q into a u-phase voltage command value v*u and a v-phase voltage command value v*V which are values falling within the three-phase AC coordinate. The sign-reversing adder 134 computes a w-phase voltage command value v*W from the phase voltage command values v*u and v*V. Specifically, the voltage command values v*u, v*V, and v*W of respective phases are computed by the following equations:

$$v^*u = \sqrt{(2/3)}[v^*d\cos\theta re - v^*q\sin\theta re] \quad (6a)$$

$$v^*V = \sqrt{(2/3)}[v^*d\cos(\theta re - 2\pi/3) - v^*q\sin(\theta re - 2\pi/3)] \quad (6b)$$

$$v^*w = -v^*u - v^*V \quad (6c).$$

The three-phase PWM control section 150 generates PWM signals Su, Sv, and SW having duty ratios corresponding to the respective phase voltage command values v*u, v*V, and v*W computed as mentioned above.

The motor drive circuit 152 is a PWM-voltage-type inverter formed by use of a switching element, for example, a power MOS transistor or the like. Respective switching elements are activated or deactivated by the PWM signals Su, Sv, and Sw, whereby the motor drive circuit generates phase voltages vu, vV, and vW to be applied to the brushless motor 6. The respective phase voltages vu, vV, and vW are output from the ECU 5 and applied to the motor 6. In response to application of the voltages, electric currents flow into coils for respective phases "u," "v," and "w" (not shown) of the motor 6, and the motor 6 generates a torque Tm for assisting steering action, in accordance with the electric currents.

Of the electric currents flowing into the motor 6, the u-phase current iu is detected by the u-phase current detector 156, and the v-phase current iv is detected by the v-phase current detector 154. The thus-detected currents are converted into current values id and iq in the d-q coordinate system by the three-phase AC/d-q coordinate conversion section 138. Of these current values id and iq falling within the d-q coordinate, the d-axis current detection value id is input to the subtractor 123, and the q-axis current detection value iq is input to the subtractor 124. As a result, in order to cause the motor 6 to generate desired steering assistant force, feedback control (hereinafter called "current control") is performed in such a way that the d-axis current detection value id becomes equal to the d-axis current command value i*d and that the q-axis current detection value iq becomes equal to the q-axis current command value i*q.

<4 Current Control System>

As mentioned above, in the present embodiment, the target current command value of the motor current is set such that appropriate steering assistance is performed in accordance with a steering torque and a vehicle velocity. The target current command value is corrected for the purpose of compensating for a torque ripple. Feedback control is performed in such a way that an electric current having the corrected target value (the d-axis current command value i*d and the q-axis current command value i*q) flows into the motor 6. A section 200 for performing such current control (hereinafter called a "current control section") in the ECU 5 corresponds to circuitry enclosed by a broken line shown in FIG. 2. In the present embodiment, in the current control section 200 serving as the controller for the motor 6, a section corresponding to the motor drive section is implemented in the form of hardware. As a result of the microcomputer 10 executing a predetermined program, a remainder of current control section except the section corresponding to the motor drive section is implemented in the form of software. A current control system having a feedback loop is configured by the current control section 200, the motor 6, and the position detection sensor 62.

Figure 6:
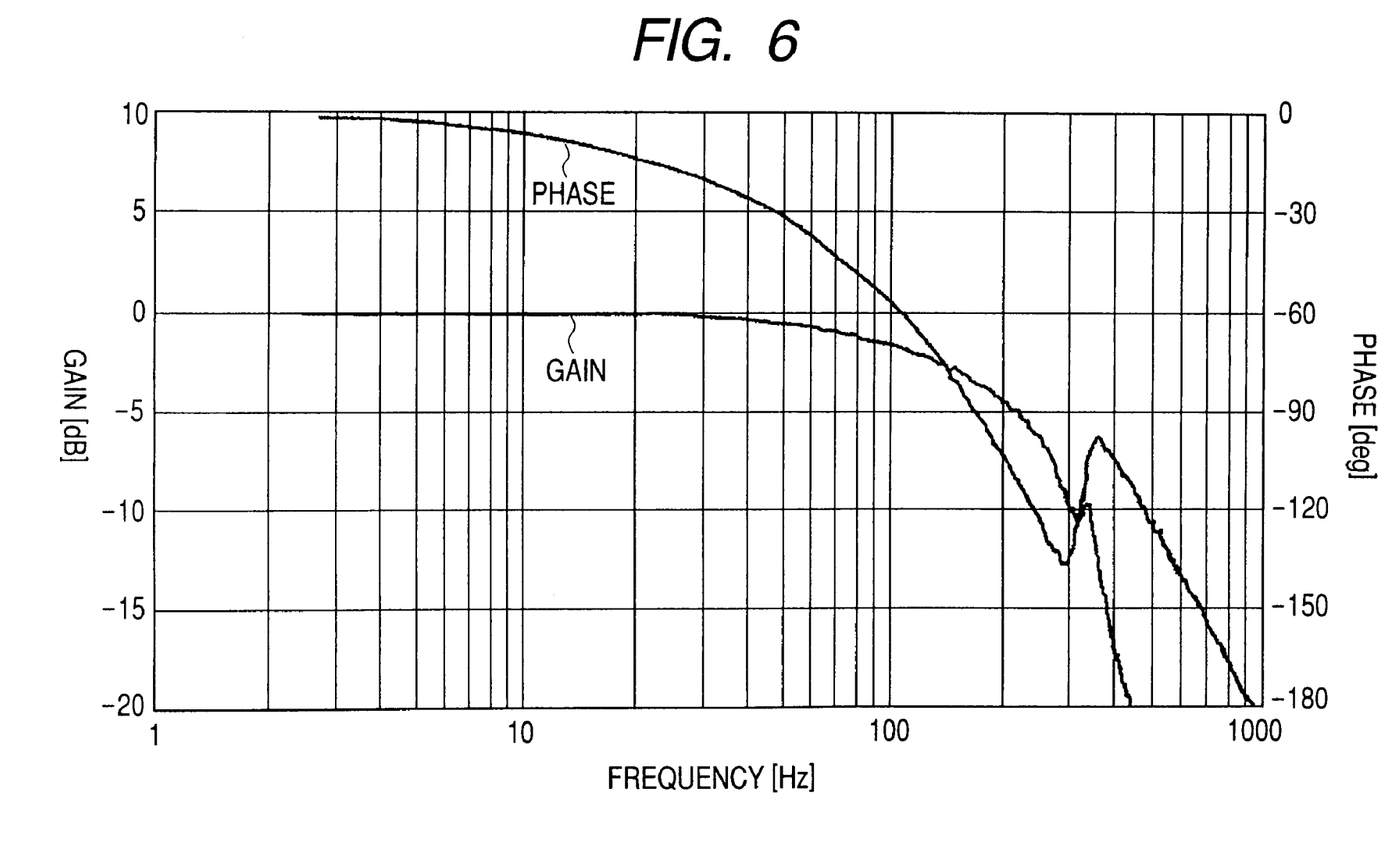
FIG. 6 is a Bode diagram showing a frequency characteristic of a current control system of the present embodiment.

FIG. 6 is a Bode diagram showing a frequency characteristic of the current control system. In either a case where the d-axis current command value i*d is taken as an input and the d-axis current detection value id is taken as an output or a case where the q-axis current command value i*q is taken as an input and the q-axis current detection value iq is taken as an output, a Bode diagram of a closed loop transmission function of the current control system becomes a diagram shown in FIG. 6. As shown in FIG. 6, the current control system has, within a practical frequency range, a frequency characteristic of exhibiting a decrease of a gain from one (a decibel value of 0) and an increase in phase delay with an increasing frequency.

<5 Configuration and Operation of the Torque Ripple Compensation Section>

Figure 3:
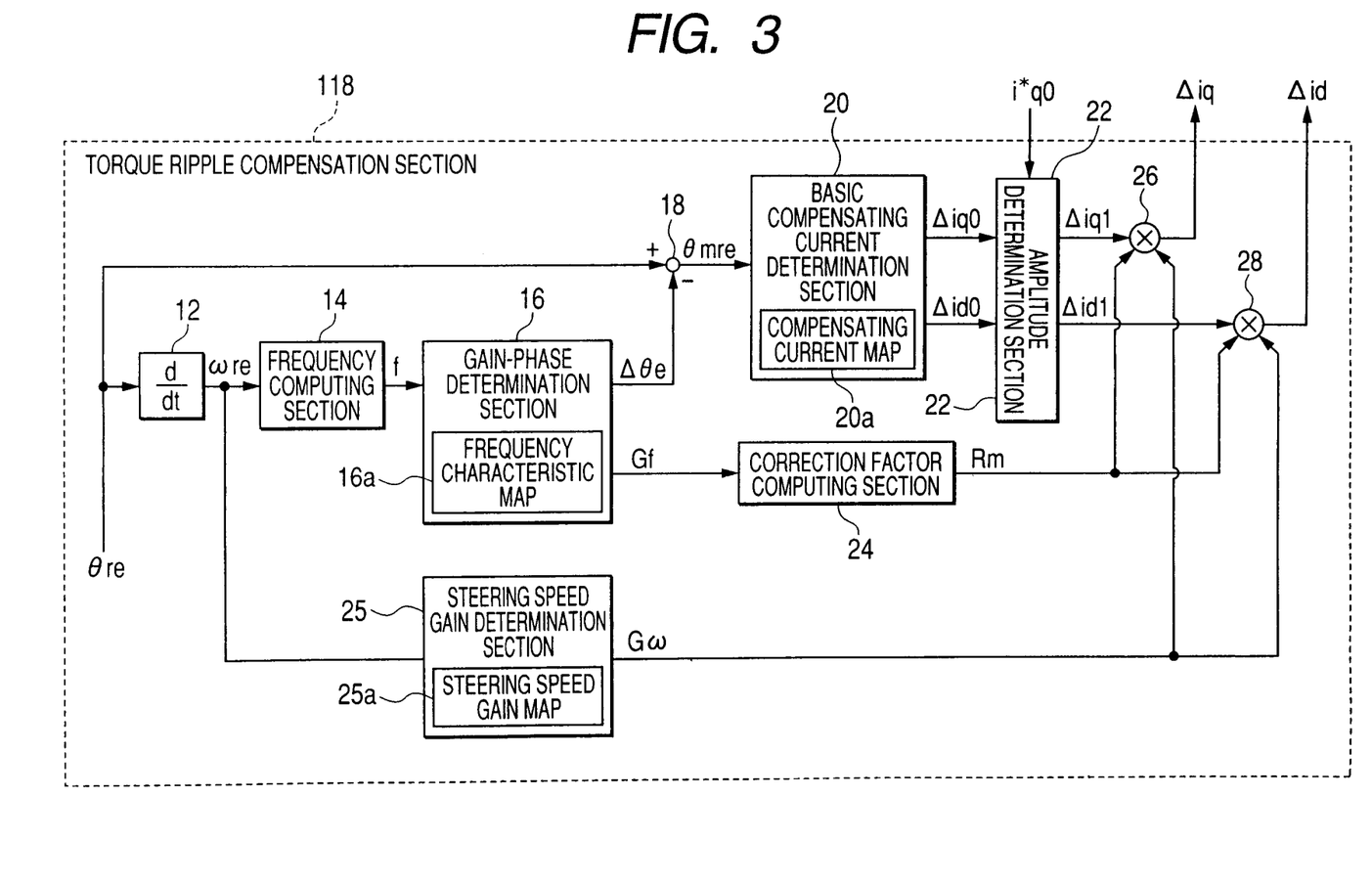
FIG. 3 is a block diagram showing a functional configuration of a torque ripple compensation section of the present embodiment.

As has already been described, the command value of the compensating current to be caused to flow into the motor 6 in order to prevent occurrence of a torque ripple; namely, the d-axis current compensation value Δid and the q-axis current compensation value Δiq, is computed by the torque ripple compensation section 118. In the present embodiment, the torque ripple compensation section 118 is also implemented in the form of software as a result of the microcomputer 10 executing a predetermined program. FIG. 3 is a block diagram showing the functional configuration of the torque ripple compensation section 118. The torque ripple compensation section 118 has a differentiator 12, a frequency computing section 14, a gain-phase determination section 16, a subtractor 18, a basic compensating current determination section 20, an amplitude determination section 22, a correction factor computing section 24, a steering speed gain determination section 25, and two multipliers 26 and 28. A signal showing the electrical angle θre is input to the differentiator 12 and the subtractor 18, and the q-axis basic current command value i*$q_0$ is input to the amplitude determination section 22.

The differentiator 12 computes a rotor angular velocity ωre; that is, a value (a rotational angular velocity equivalent to an electrical angle) corresponding to the rotational angular velocity of the motor 6, by differentiating the signal showing the electrical angle θre. The frequency computing section 14 computes a frequency "f" ("f" corresponds to the frequency of the compensating current) of the torque ripple of the motor 6 from the rotor angular velocity ωre. Specifically, the frequency "f" is computed by the following equation:

$$f = S \cdot \omega re/(2\pi) \tag{7}$$

where S designates the number of slots of the motor 6.

The gain-phase determination section 16 retains a frequency characteristic map corresponding to the Bode diagram shown in FIG. 6; that is, a frequency characteristic map 16a showing a frequency characteristic of a current control system (specifically, data corresponding to the frequency characteristic map 16a are stored in memory in the microcomputer 10 beforehand). The gain-phase determination section 16 determines a gain Gf and a phase difference Δθe of the current control system corresponding to the frequency "f" by reference to the frequency characteristic map 16a. As mentioned above, in the current control system, the gain decreases from one and a phase delay becomes greater as the frequency increases. Hence, the gain Gf determined by the gain-phase determination section 16 assumes a value of one or less (a negative value expressed in decibel), and the phase difference Δθe assumes a negative value. Such a gain Gf is input to the correction factor computing section 24, and the phase difference Δθe is input to the subtractor 18.

The subtractor 18 subtracts the phase difference Δθe from the electrical angle θre and outputs a result of subtraction θre−Δθe as a corrected electrical angle θmre. By the subtraction, a phase delay induced by a frequency characteristic of the current control system is compensated for. The corrected electrical angle θmre acquired as a result of a phase delay in the electrical control system being compensated for is input to the basic compensating current determination section 20.

The basic compensating current determination section 20 retains, as a compensating current map 20a, a table showing a relationship between an electrical angle and the d-axis and q-axis current compensation values (specifically, data corresponding to the compensating current map 20a are stored in advance in memory in the microcomputer 10). By reference to the compensating current map 20a, a d-axis current unit compensation value Δid$_0$ and a q-axis current unit compensation value Δiq$_0$ corresponding to the corrected electrical angle θmre are determined. A method for preparing the compensating current map 20a will be described hereunder.

When a sinusoidal wave current is caused to flow as respective phase currents iu, iv, and iw in the case where distortion exists in a waveform of no-load induced electromotive force of the motor 6, a torque ripple arises. However, so long as instantaneous values $e_0u$, $e_0v$, and $e_0w$ of respective phases achieved at respective points in time of the no-load induced electromotive force are known, the electric currents iu, iv, and iw of respective phases which do not induce a torque ripple can be determined with taking an output torque of the motor 6 as a constant value (e.g., 1 [Nm]). For instance, the current values iu, iv, and iw of respective phases which do not cause a torque ripple with taking the output torque as a constant value T can be determined by the following equations:

$$iu = \{(e_0u - e_0V) + (e_0u - e_0W)\}T/\{(e_0u - e_0V)^2 + (e_0u - e_0W)^2 + (e_0W - e_0V)^2\} \tag{8a}$$

$$iv = \{T - (e_0u - e_0W)iu\}/(e_0V - e_0W) \tag{8b}$$

$$iw = \{T - (e_0u - e_0V)iu\}/(e_0W - e_0V) \tag{8c}$$

The current values iu, iv, and iw of respective phases determined by the above equations are converted into values falling within the d-q coordinate, whereby the d-axis current value id and the q-axis current value iq which does not cause the torque ripple with taking the output torque as the constant value T can be determined.

$$id = \sqrt{2}\{iv \sin \theta - iu \sin(\theta - 2\pi/3)\} \tag{9a}$$

$$iq = \sqrt{2}\{iv \cos \theta - iu \cos(\theta - 2\pi/3)\} \tag{9b}$$

where θ designates an electrical angle.

Figure 4:
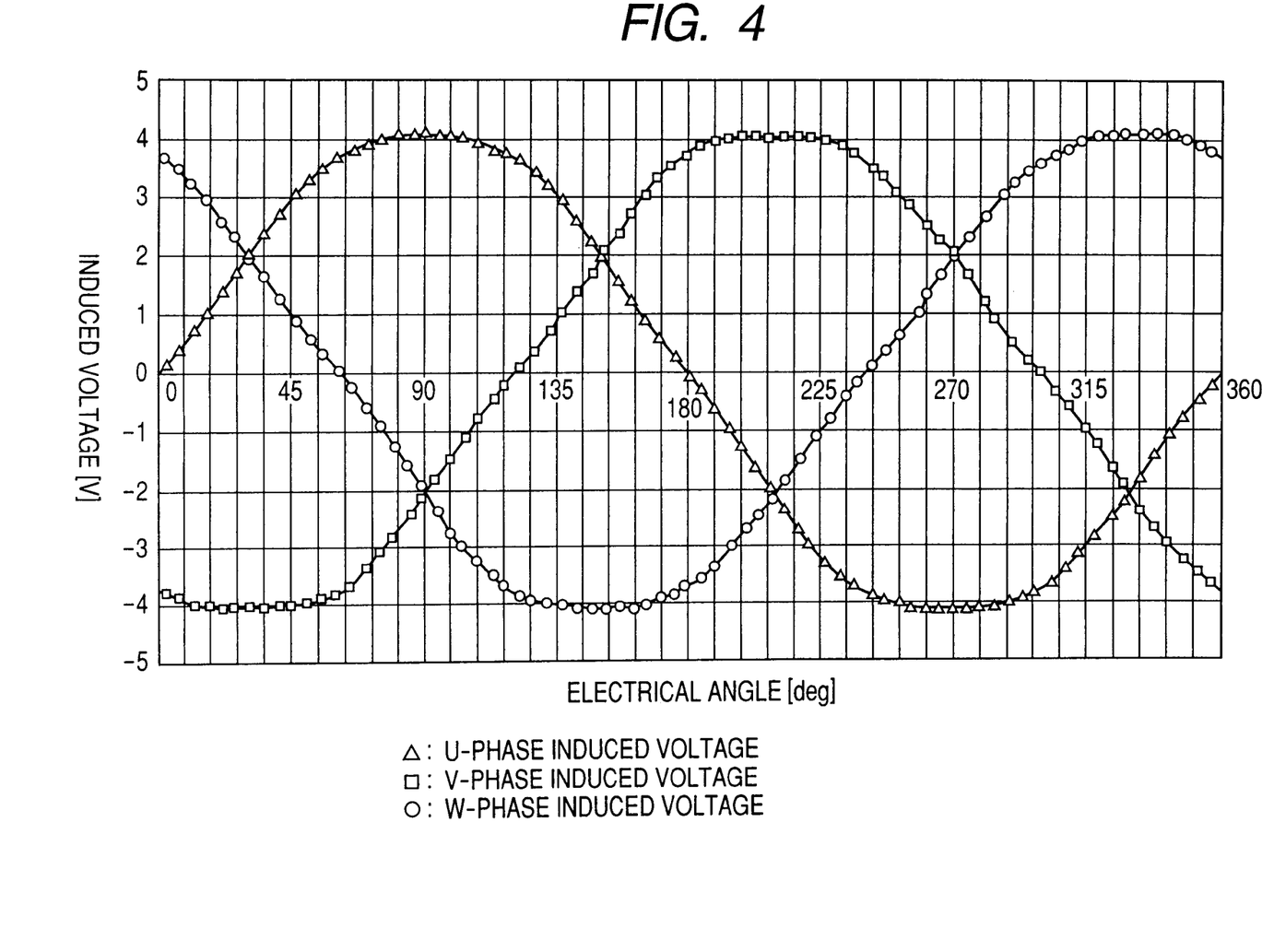
FIG. 4 is a voltage waveform chart showing no-load induced electromotive force (an induced voltage) of a brushless motor of the present embodiment.
Figure 5:
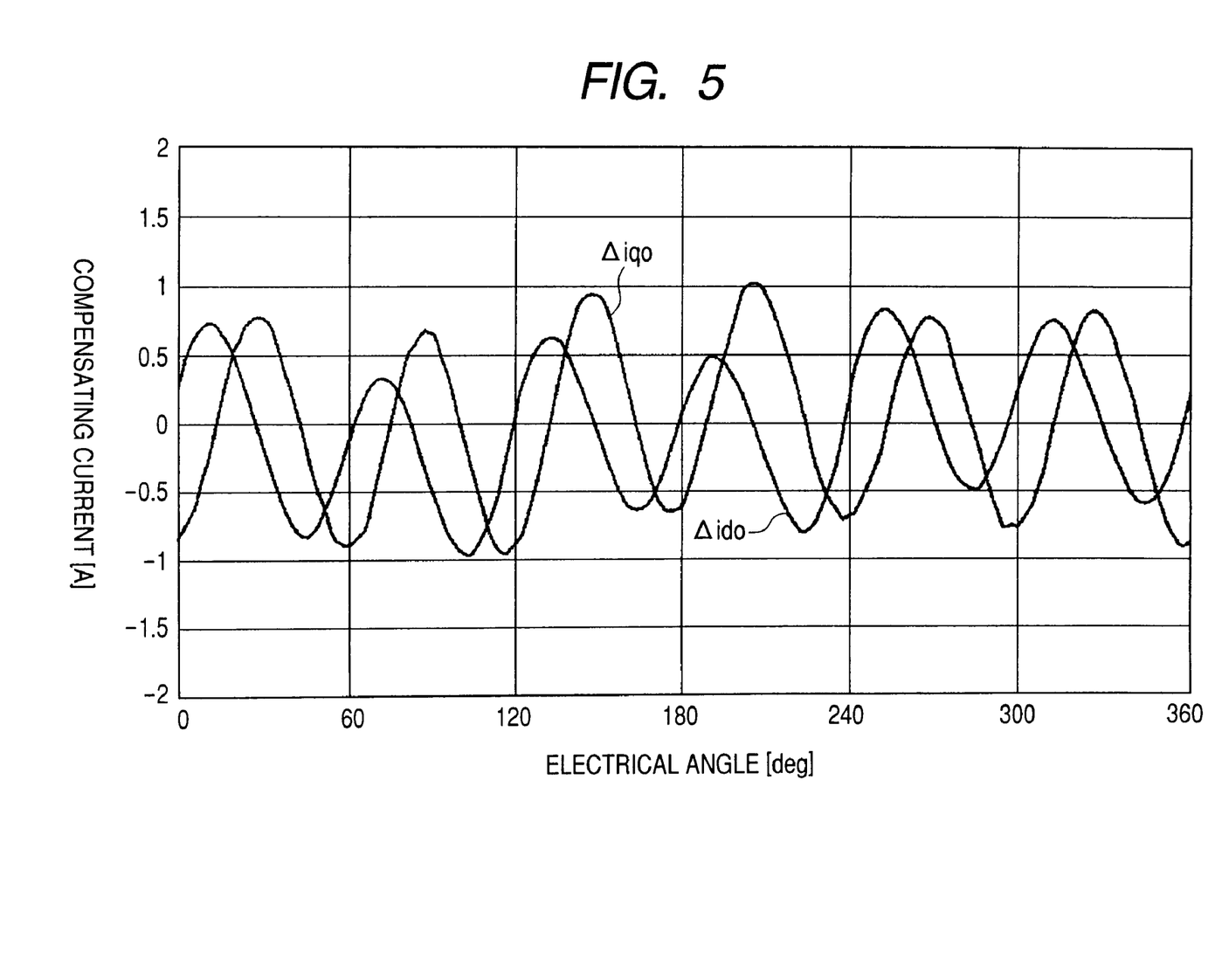
FIG. 5 is a current waveform chart showing a compensation current to be caused to flow into the motor in order to compensate for the torque ripple in the present embodiment.

In the present embodiment, the compensating current map 20a is prepared as follows. First, as shown in FIG. 4, actual measured data pertaining to the instantaneous values $e_0u$, $e_0v$, and $e_0W$ of the no-load induced electromotive force (an induced voltages) of respective phases of the motor 6 are previously determined in connection with various values of the electrical angles. A d-axis current value id$_{01}$ and a q-axis current value iq$_{01}$ required for the motor 6 to output a unit torque (1 [Nm]) without involvement of a torque ripple are computed by use of the actual measured data [see Equations (8a) to (9b)]. When no distortion exists in the waveform of no-load induced electromotive force, a d-axis current value id$_{02}$ and a q-axis current value iq$_{02}$ required for the motor 6 to output the unit torque (in this case, the output torque is proportional to the q-axis current, and the essential requirement is to set the d-axis current to 0. Accordingly, the q-axis current iq$_{02}$ and the d-axis current id$_{02}$ can be readily determined) are determined. A difference between the d-axis current values Δid$_0$ = id$_{01}$ − id$_{02}$ is taken as a d-axis current unit compensation value Δid$_0$, and a difference between the q-axis current values Δiq$_0$ = iq$_{01}$ − iq$_{02}$ is taken as a q-axis current unit compensation value Δiq$_0$. A table which associates the unit compensation values Δid$_0$ and Δiq$_0$ with the various values of electrical angles is stored in advance in memory as the compensation current map 20a. For instance, in accordance with actual measured data pertaining to the waveform of no-load induced electromotive force, such as that shown in FIG. 4, the d-axis current unit compensation value Δid$_0$ and the q-axis current unit compensation value Δiq$_0$ associated with the electrical angles as shown in FIG. 5 are determined, and the compensating current map 20a is prepared in accordance with the thus-determined current unit compensation values.

By reference to the compensating current map 20a prepared as mentioned above, the basic compensating current determination section 20 determines the q-axis current unit compensation value $\Delta iq_0$ and the d-axis current unit compensation value $\Delta id_0$ corresponding to the corrected electrical angle $\theta$mre. The q-axis current unit compensation value $\Delta iq_0$ and the d-axis current unit compensation value $\Delta id_0$ are input as a current compensation value per unit torque to an amplitude determination section 22.

Provided that the output torque from the motor 6 is taken as T, the q-axis current compensation value $\Delta iq$ and the d-axis current compensation value $\Delta id$, which are to be caused to flow into the motor 6 in order to prevent occurrence of a torque ripple, assume a value which is T times as large as the q-axis current unit compensation value $\Delta iq_0$ and a value which is T times as large as the d-axis current unit compensation value $\Delta id_0$, respectively. Consequently, in order to acquire the q-axis current compensation value $\Delta iq$ and the d-axis current compensation value $\Delta id$, the q-axis current unit compensation value $\Delta iq_0$ and the d-axis current unit compensation value $\Delta id_0$ are multiplied by a coefficient in response to a physical quantity corresponding to the load on the motor. For instance, it is essentially only that the q-axis current unit compensation value $\Delta iq_0$ and the d-axis current unit compensation value $\Delta id_0$ be multiplied by a coefficient in response to a detected value of the q-axis current iq—a value corresponds to the output torque of the motor 6—or the q-axis basic current command value $i^*q_0$, thereby computing, as a value proportional to the load on the motor, the q-axis current compensation value $\Delta iq$ and the d-axis current compensation value $\Delta id$. The amplitude determination section 22 of the present embodiment determines a motor torque value corresponding to the input q-axis basic current command value $i^*q_0$, and multiplies the q-axis current unit compensation value $\Delta iq_0$ and the d-axis current unit compensation value $\Delta id_0$ by the thus-determined torque value, thereby determining a q-axis current basic compensation value $\Delta iq_1$ and a d-axis current basic compensation value $\Delta id_1$. The thus-determined q-axis current basic compensation value $\Delta iq_1$ and d-axis current basic compensation value $\Delta id_1$ are input to the multipliers 26 and 28, respectively.

The correction factor computing section 24 computes, as a correction rate Rm, a reciprocal 1/Gf of the gain Gf that is output, as a gain of the current control system, from the gain-phase determination section 16. The correction rate Rm is input to the multipliers 26 and 28.

Figure 7:
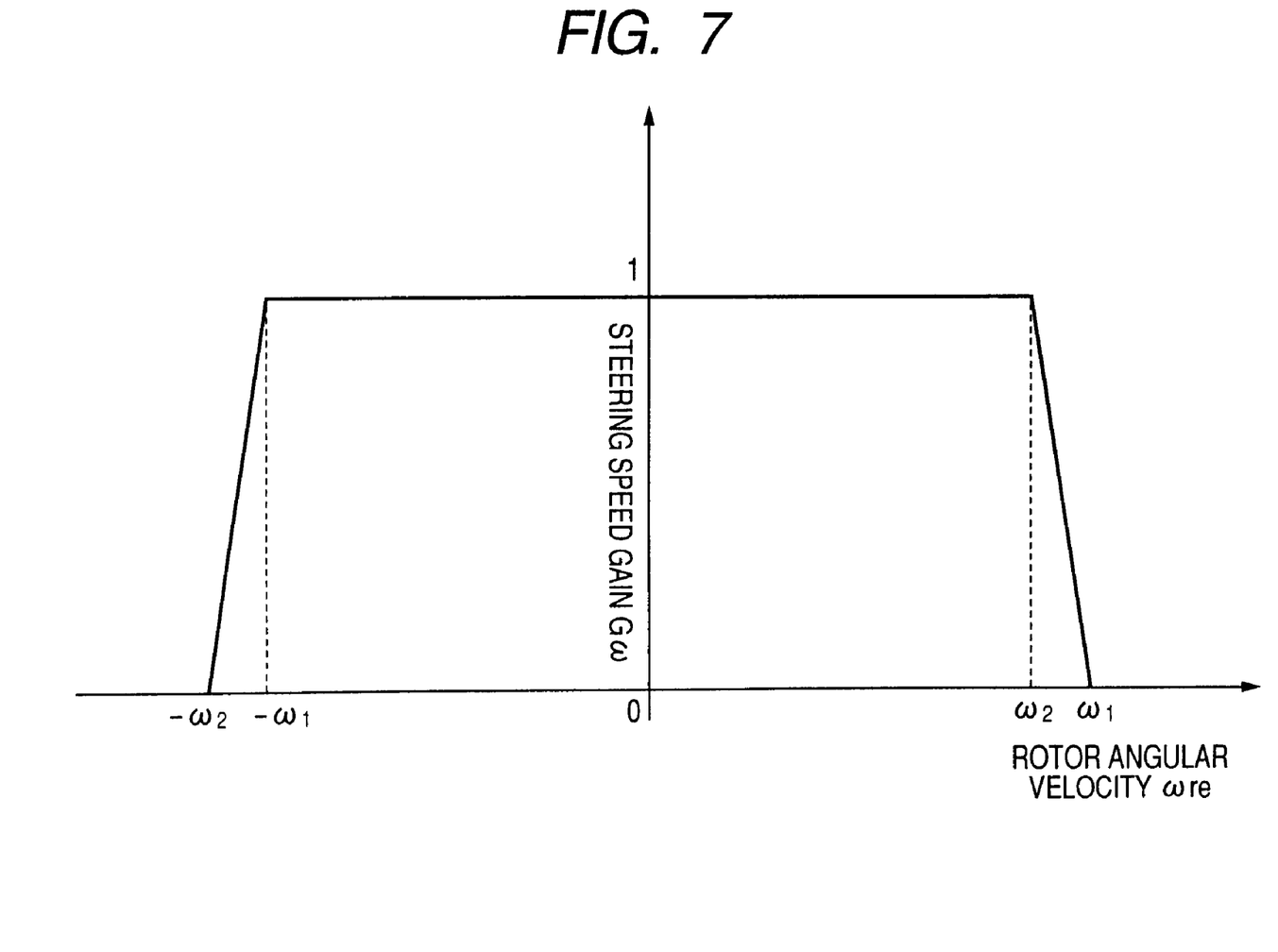
FIG. 7 is a descriptive view showing an example steering speed gain map used for control processing performed by a steering speed gain determination section shown in FIG. 3.

The steering speed gain determination section 25 retains a steering speed gain map 25a shown in FIG. 7 (specifically data corresponding to the steering sped gain map 25a are stored in advance in the memory provided in the microcomputer 10). By reference to the steering speed gain map 25a, the steering speed gain determination section 25 determines a steering speed gain G$\omega$ corresponding to the rotor angular velocity $\omega$re.

As shown in FIG. 7, provided that a direction of assisting rightward steering action is taken as a positive direction and that a direction of assisting leftward steering action is taken as a negative direction, the steering speed gain map 25a sets a steering speed gain G$\omega$ to 0 when the rotor angular velocity $\omega$re is equal to or greater than a first threshold value $\omega_1$. When the rotor angular velocity $\omega$re is not equal to or greater than 90% (a second threshold value $\omega_2$) of the first threshold value $\omega_1$, the steering speed gain G$\omega$ is set to one. When the rotor angular velocity $\omega$re is equal to or greater than the second threshold value $\omega_2$ and when the rotor angular velocity $\omega$re is not equal to or greater than the first threshold value $\omega_1$, the steering speed gain G$\omega$ is set so as to decrease from one to zero as the rotor angular velocity $\omega$re becomes faster. The first threshold value $\omega_1$ is a rotor angular velocity achieved when the torque ripple (a compensated torque ripple) of the motor 6 controlled in accordance with the current command values $i^*d$ and $i^*q$ determined by the adders 121 and 122 becomes equal to a torque ripple (a uncompensated torque ripple) of the motor 6 achieved when the motor 6 is controlled in accordance with the basic current command values $i^*d_0$ and $i^*q_0$ without consideration of the current compensation values $\Delta id$ and $\Delta iq$. The thus-determined steering speed gain G$\omega$ is input to the multipliers 26 and 28 as in the case of the correction factor Rm.

The multiplier 26 multiplies the q-axis current basic compensation value $\Delta iq_1$ by the correction rate Rm and the steering speed gain G$\omega$, thereby determining the q-axis current compensation value $\Delta iq$. The multiplier 28 multiplies the d-axis current basic compensation value $\Delta id_1$ by the correction rate Rm and the steering speed gain G$\omega$, there by determining the d-axis current compensation value $\Delta id$. A decrease in gain attributable to the frequency characteristic of the current control system is compensated by multiplication of such a correction factor Rm. Further, the q-axis current compensation value $\Delta iq$ and the d-axis current compensation value $\Delta id$ are computed with considering the rotor angular velocity $\omega$re by multiplication of such a steering speed gain G$\omega$.

The thus-acquired q-axis current compensation value $\Delta iq$ and d-axis current compensation value $\Delta id$ are output from the torque ripple compensation section 118. As mentioned previously, the q-axis current compensation value $\Delta iq$ is added to the q-axis basic current command value $i^*q_0$, and the d-axis current compensation value $\Delta id$ is added to the d-axis basic current command value $i^*d_0$ [see Equations (4a) and (4b)]. The thus-acquired q-axis current command value $i^*q$ and d-axis current command value $i^*d$ are provided, as target values, to the current control system including the current control section 200.

<6 Advantages>

As mentioned above, in the electric power steering system 1 of the present embodiment, during setting of the compensation current command values for reducing a torque ripple, there are computed the q-axis current basic compensation value $\Delta iq_1$ and the d-axis current basic compensation value $\Delta id_1$ which are proportional to the q-axis basic current command value $i^*q_0$ that is a physical quantity corresponding to the load on the motor. In addition, the q-axis current basic compensation value $\Delta iq_1$ and the d-axis current basic compensation value $\Delta id_1$ are multiplied by the correction factor Rm obtained by the gain-phase determination section 16 and the correction factor computing section 24 in such a way that the decrease in gain attributable to the frequency characteristic of the current control system is compensated for. The q-axis current compensation value $\Delta iq$ and the d-axis current compensation value $\Delta id$, which are results of multiplication, are used as a compensation current command value for reducing a torque ripple. Therefore, when a change arises in the rotational speed of the motor 6 according to driving conditions, the amplitude of the compensating current serving as a command value indicated by the q-axis current compensation value $\Delta iq$ and the d-axis current compensation value $\Delta id$ is corrected in accordance with the change in rotational speed. Moreover, in the present embodiment, the electrical angle $\theta$re is corrected in accordance with a phase difference $\Delta\theta e$ (a negative value) determined by the gain-phase determination section 16 in such a way that the phase delay attributable to the frequency characteristic of the current control system is compensated for. The q-axis current unit compensation value $\Delta i_q 0$ and the d-axis current unit compensation value $\Delta i_d 0$, which correspond to the resultantly-acquired corrected electrical angle θmre, are determined from the compensating current map 20a. The q-axis current compensation value Δiq and the d-axis current compensation value Δid are determined from these compensation values.

As mentioned above, in the present embodiment, the amplitude of the compensating current to be caused to flow into the motor 6 for reducing a torque ripple changes in accordance with fluctuations in the load on the motor. In addition, the amplitude and phase of the compensating current serving as a command value are corrected in accordance with the rotational speed of the motor 6 so as to cancel the influence of the frequency characteristic of the current control system (therefore in accordance with the frequency of the compensating current). Moreover, a phase difference between an actual compensating current and an induced voltage of the motor 6 is resolved by correction, and hence there is obviated adjustment of the phase of the compensating current in accordance with the load on the motor. Consequently, the motor 6 is provided with an appropriate compensating current even in a case where the rotational speed of the motor 6 changes from moment to moment according to a driving condition besides the case of occurrence of fluctuations in the load imposed on the motor, so that occurrence of a torque ripple can be reduced sufficiently.

Further, in the electric power steering system 1 of the present embodiment, in a case where a computing period of the torque ripple compensation section 118 that computes the current compensation values Δid and Δiq to be caused to flow into the motor 6 in order to prevent occurrence of a torque ripple in the motor 6 differs from a control period of the current control section 200 that controls a feedback to the motor 6 in such a way that the current command values i*d and i*q additionally provided with the current compensation values Δid and Δiq flow into the motor 6, the microcomputer 10 (a motor controller) sets the current compensation values Δid and Δiq to zero when the rotor angular velocity ωre is equal to or greater than the first threshold value $\omega_1$.

As mentioned above, when the computing period of the torque ripple compensation section 118 is longer than the control period of the current control section 200, an offset arises in electrical angles as the rotor angular velocity ωre becomes faster, and control is performed while the torque ripple compensation and the current control are out of phase with each other. Therefore, an effect of a reduction in torque ripple is diminished.

Thus, when the rotor angular velocity ωre is equal to or greater than the first threshold value $\omega_1$, the current compensation values Δid and Δiq are multiplied by the steering speed gain Gω=0. As a result, when the rotor angular velocity ωre is equal to or greater than the first threshold value $\omega_1$, the current compensation values Δid and Δiq come to zero, whereby a torque ripple is not compensated for. Therefore, when the rotor angular velocity ωre (a rotational speed of the motor) is equal to or greater than the first threshold value $\omega_1$, the compensated torque ripple does not become worse than the uncompensated torque ripple, and the uncompensated torque ripple is at least maintained. Hence, the torque ripple can be reduced.

Further, in the electric power steering system 1 of the present embodiment, the microcomputer 10 (a motor controller) causes the motor to generate steering assist force in response to action for steering a vehicle, thereby assisting steering action. As a result, when the rotor angular velocity ωre becomes faster, to thus come to the first threshold value $\omega_1$ or more, the current compensation values Δid and Δiq come to zero, so that the compensated torque ripple does not become worse than the uncompensated torque ripple. Thus, an electric power steering system exhibiting the working effects described above can be implemented. Therefore, there can be provided an electric power steering system capable of reducing a torque ripple even when the rotor angular velocity ωre of the motor 6 has become faster.

<7 Modification>

The present invention is not limited to the embodiment and may also be embodied as follows. Even in such a case, working-effects equal to or greater than those yielded in the embodiment are achieved.

(1) In the first embodiment, the three-phase brushless motor 6 is used as a drive source of the electric power steering system 1. However, even in a case where a brushless motor other than the three-phase brushless motor is used, a similar advantage is achieved by a configuration analogous to that mentioned above.

(2) As shown in FIG. 7, when the rotor angular velocity ωre is not equal to or greater than a second threshold value $\omega_2$ (90% of the first threshold value $\omega_1$), the steering speed gain map 25a sets the steering speed gain Gω to one. When the rotor angular velocity ωre is equal to or greater than the second threshold value $\omega_2$ and not equal to or greater than the first threshold value $\omega_1$, the steering speed gain Gω is set so as to decrease from one to zero as the rotor angular velocity ωre becomes faster. In addition, in accordance with a steering condition or the like, the second threshold value $\omega_2$ may also be set so as to be changed according to conditions. As a result, the current compensation values Δid and Δiq can be computed appropriately.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

What is claimed is:

1. A motor controller comprising:
a rotational angle detector that detects a rotational angle of a motor;
a rotational speed detector that detects a rotational speed of the motor;
a compensating current computing unit that computes, based on the rotational angle and a predetermined target current command value, and by multiplying a basic compensation value by a steering speed gain, a compensating current command value defining a current to flow into the motor to prevent occurrence of a torque ripple, which is derived from distortion in a waveform of electromotive force induced by the motor;
a correction unit that corrects the predetermined target current command value in accordance with the compensating current command value;
a controller which performs a feedback control for the motor in such a way that an electric current corresponding to the predetermined target current command value corrected by the correction unit flows into the motor, the controller constituting a system for controlling an electric current of the motor by the feedback control, a computing period of the compensating current computing unit being different from a control period of the controller; and means for setting the compensating current command value to zero when the rotational speed is equal to or greater than a first threshold value, by setting the steering speed gain to zero, where the first threshold value is the rotational speed of the motor where a torque ripple of the motor controlled by the controller based on the predetermined target current command value corrected by the correction unit becomes equal to a torque ripple of the motor acquired based on the predetermined target current command without being corrected by the correction unit.

2. The motor controller according to claim 1, wherein the compensating current computing unit comprising means for performing computation to reduce the compensating current command value as the rotational speed increases, when the rotational speed is equal to or greater than a second threshold value of a predetermined rotation speed slower than the first threshold value and is not equal to or greater than the first threshold value; and the compensating current computing unit comprises means for performing computation to change the compensating current command value to a current command value to be caused to flow into the motor in order to prevent occurrence of the torque ripple when the rotational speed is not equal to or greater than the second threshold value.

3. An electric power steering system for assisting steering by causing a motor to generate steering assist force in response to steering operation, a predetermined target current command value being a current command value determined according to the operation for steering a vehicle, wherein driving of the motor is controlled by the motor controller according to claim 1.

4. An electric power steering system for assisting steering by causing a motor to generate steering assist force in response to steering operation, a predetermined target current command value being a current command value determined according to the operation for steering a vehicle, wherein driving of the motor is controlled by the motor controller according to claim 2.

* * * * *